US010366460B2

(12) United States Patent
Bhogal et al.

(10) Patent No.: US 10,366,460 B2
(45) Date of Patent: Jul. 30, 2019

(54) OPTIMIZED ROUTE SHARING

(71) Applicant: International Business Machines Corporation, Armonk, NY (US)

(72) Inventors: Kulvir S. Bhogal, Fort Worth, TX (US); Gregory J. Boss, Saginaw, MI (US); Rick A. Hamilton, II, Charlottesville, VA (US); Agueda Martinez Hernandez Magro, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 15/057,262

(22) Filed: Mar. 1, 2016

(65) Prior Publication Data

US 2017/0254656 A1    Sep. 7, 2017

(51) Int. Cl.
*G01C 21/34* (2006.01)
*G06Q 10/02* (2012.01)
*G06Q 50/30* (2012.01)
*G06Q 50/14* (2012.01)

(52) U.S. Cl.
CPC ......... *G06Q 50/14* (2013.01); *G01C 21/3484* (2013.01)

(58) Field of Classification Search
CPC .... G01C 21/20; G01C 21/3438; G06W 50/14
See application file for complete search history.

(56) References Cited

U.S. PATENT DOCUMENTS

| 8,284,748 | B2 | 10/2012 | Borghei |
| 8,799,038 | B2 | 8/2014 | Chen et al. |
| 2008/0270019 | A1* | 10/2008 | Anderson .......... G01C 21/3438 |
| | | | 701/533 |
| 2010/0114626 | A1 | 5/2010 | Piccinini et al. |
| 2012/0323642 | A1 | 12/2012 | Camp et al. |

(Continued)

FOREIGN PATENT DOCUMENTS

WO      2010125499 A1      11/2010

OTHER PUBLICATIONS

Alex, "Announcing UberPool", posted Aug. 5, 2014, printed on Jan. 29, 2016, 3 pages.

*Primary Examiner* — Charles J Han
(74) *Attorney, Agent, or Firm* — Steven L. Fisher-Stawinski; William H. Hartwell

(57) ABSTRACT

A computer-implemented method includes identifying a first traveler profile and additional traveler profiles. Each traveler profile is associated with a mobile device. The method further includes, for the first traveler profile, determining a first travel pattern, based on geographically tracking the first traveler mobile device, and determining an additional travel patterns, based on geographically tracking the additional travelers' mobile devices. The method further includes determining a compatible route between the first traveler profile and a compatible traveler profile, based on optimizing the first travel pattern with the additional travel patterns, wherein the first traveler profile includes an optimal driver for the at least one compatible route. The computer-implemented method further includes presenting to the first traveler profile, via its mobile device, a suggestion that the first traveler profile become a driver profile for at least one travel application. A corresponding computer program product and computer system are also disclosed.

15 Claims, 4 Drawing Sheets

(56) References Cited

U.S. PATENT DOCUMENTS

2015/0278712 A1    10/2015  Fujita et al.
2016/0364823 A1*   12/2016  Cao .................. G06Q 50/30
2017/0169366 A1*    6/2017  Klein ................ G06Q 10/025
2017/0193625 A1*    7/2017  Fan .................. G06O 50/30

* cited by examiner

OPTIMIZED ROUTE SHARING

BACKGROUND

The present invention relates generally to the field of route planning, and more particularly to suggesting efficient transport for mobile device users.

Travel-related mobile device applications with a variety of functions in recent years. Users rely upon route planning and suggestions to achieve optimal mode selection and routing in a variety of contexts. Users continue to face challenges in discovering optimal transport modes and routes.

SUMMARY

A computer-implemented method includes identifying a first traveler profile and one or more additional traveler profiles. The first traveler profile is associated with a first mobile device. Each of the one or more additional traveler profiles is associated with an additional mobile device. The computer-implemented method further includes, for the first traveler profile, determining a first travel pattern, based on geographically tracking the first mobile device, and for each of the one or more additional traveler profiles, determining an additional travel pattern, based on geographically tracking the additional mobile device. The computer-implemented method further includes determining at least one compatible route between the first traveler profile and at least one compatible traveler profile of the one or more additional traveler profiles, based on optimizing the first travel pattern with the additional travel patterns, wherein the first traveler profile includes an optimal driver for the at least one compatible route. The computer-implemented method further includes presenting to the first traveler profile, via the first mobile device, a suggestion that the first traveler profile become a driver profile for at least one travel application. A corresponding computer program product and computer system are also disclosed.

DETAILED DESCRIPTION

Figure 1:
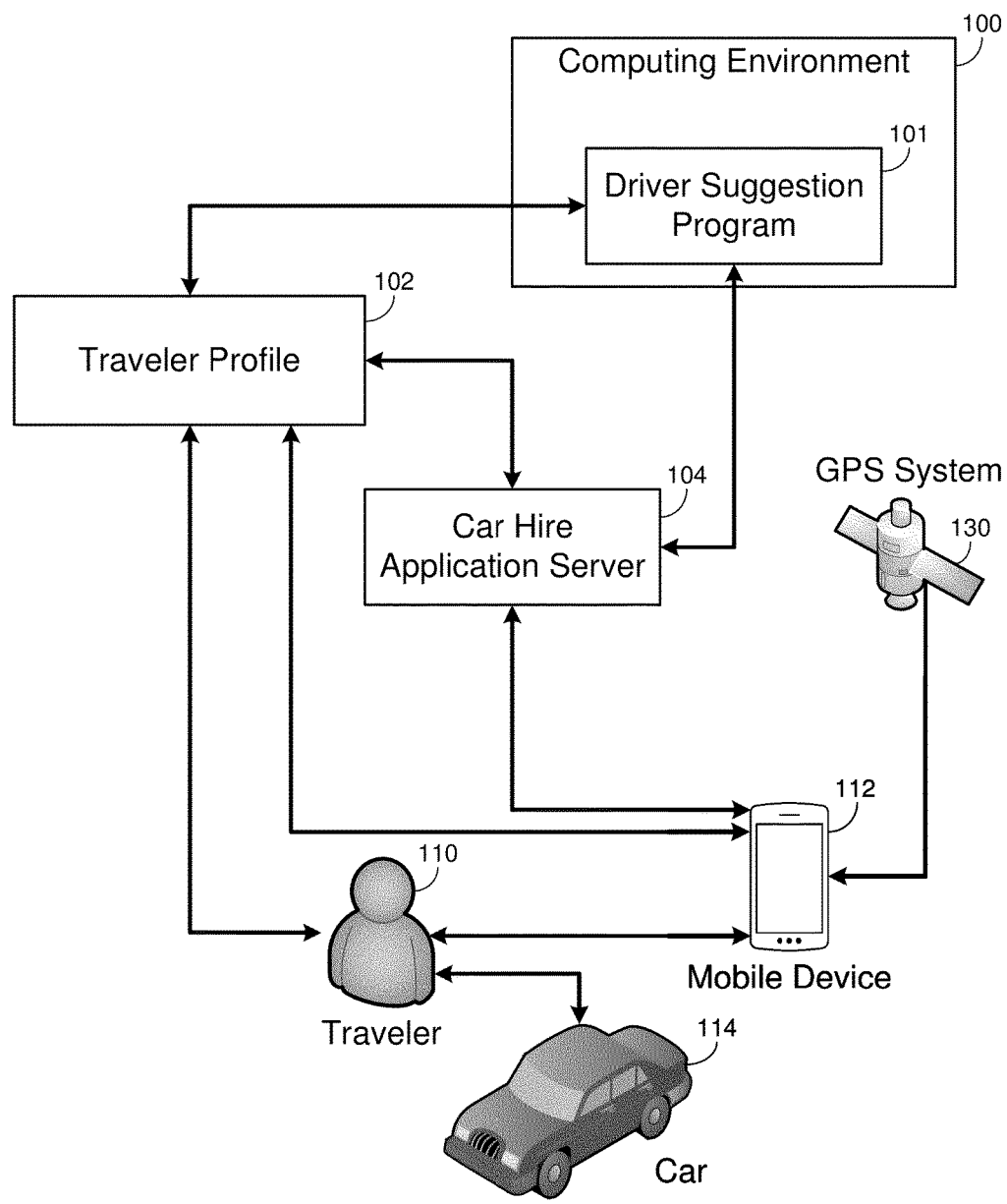
FIG. 1 is a block diagram depicting an exemplary operating environment for a driver suggestion program, in accordance with at least one embodiment of the present invention.

FIG. 1 is a block diagram depicting an exemplary operating environment for a driver suggestion program 101, in accordance with at least one embodiment of the present invention. The driver suggestion program 101 operates on a computing environment 100, which may be a physical, logical, virtual, or cloud-based application server. A car hire application server 104 may support a car hire service. A car hire service includes services such as Uber® and Lyft® wherein a user may book a ride as a passenger to be driven by another user, and wherein a user may apply to become a driver using his or her own car.

In the depicted model, a traveler 110 may be digitally represented by a traveler profile 102. The traveler 110 may use a mobile device 112 to access and use various travel applications, including one or more car hire applications. The traveler 110 may own, lease, or otherwise have the use of a car 114. More generally, the car 114 may be understood as a passenger car, however other vehicles including vans, trucks, buses, boats, airplanes, helicopters, submarines, etc. may also be contemplated. In most embodiments, the car 114 would be a vehicle ordinarily kept for personal private use by the owner and not customarily for paid transport of passengers or cargo. The mobile device 112 may be capable of determining its own geographic position from broadcast data from a satellite navigation system such as the Global Positioning System (GPS System 130), mobile data signal telemetry, IP-address based geolocation, or other means. The mobile device 112 may also communicate with and store information to the traveler profile 102, whether as a function of a travel application a mobile device operating system such as Google® Android® or Apple® iOS®.

The traveler profile 102 may include data regarding the traveler 110, including routes travelled, modes of transport, and travel applications used. For example, the traveler profile 102 may hold information regarding routes frequently traveled, as assessed through the mobile device 112 performing a geographical tracking function, and inferred locations of the traveler 110's home, work, and/or school, based on those routes. The mobile device 112 may be further configured to ascertain the mode of travel. For example, the mobile device 112 may interface with the data, audio, or navigation systems of the car 114 to determine whether the traveler 110 is using his or her own car, or the mobile device 112 may infer, based on usage of one or more travel applications that the traveler 110 is using a ride hire service (e.g., movement consistent with a ride booked by Uber® or Lyft®) or public transit (e.g., use of apps that track buses and trains).

The inventors have observed and/or recognized that travel efficiencies may be obtained by identifying mobile device users whose routes align and suggesting that such users not only share rides on a noncommercial basis, but that one user become a driver for a ride hire service and the other compatible traveler profiles become passenger profiles. Advantageously, some embodiments of the invention may benefit traffic congestion by removing vehicles from the road. Advantageously, some embodiments of the invention may provide users with extra income by enabling them to become drivers for hire with minimal modification to their pre-existing routes. Advantageously, some embodiments of the invention may provide users with reduced transport costs by being passengers in a car hire service in a manner that allows the fuel and maintenance costs to be shared among two or more people. It will be understood, however, that these are merely possible advantages and are not necessarily present in any particular embodiment of the invention.

Figure 2:
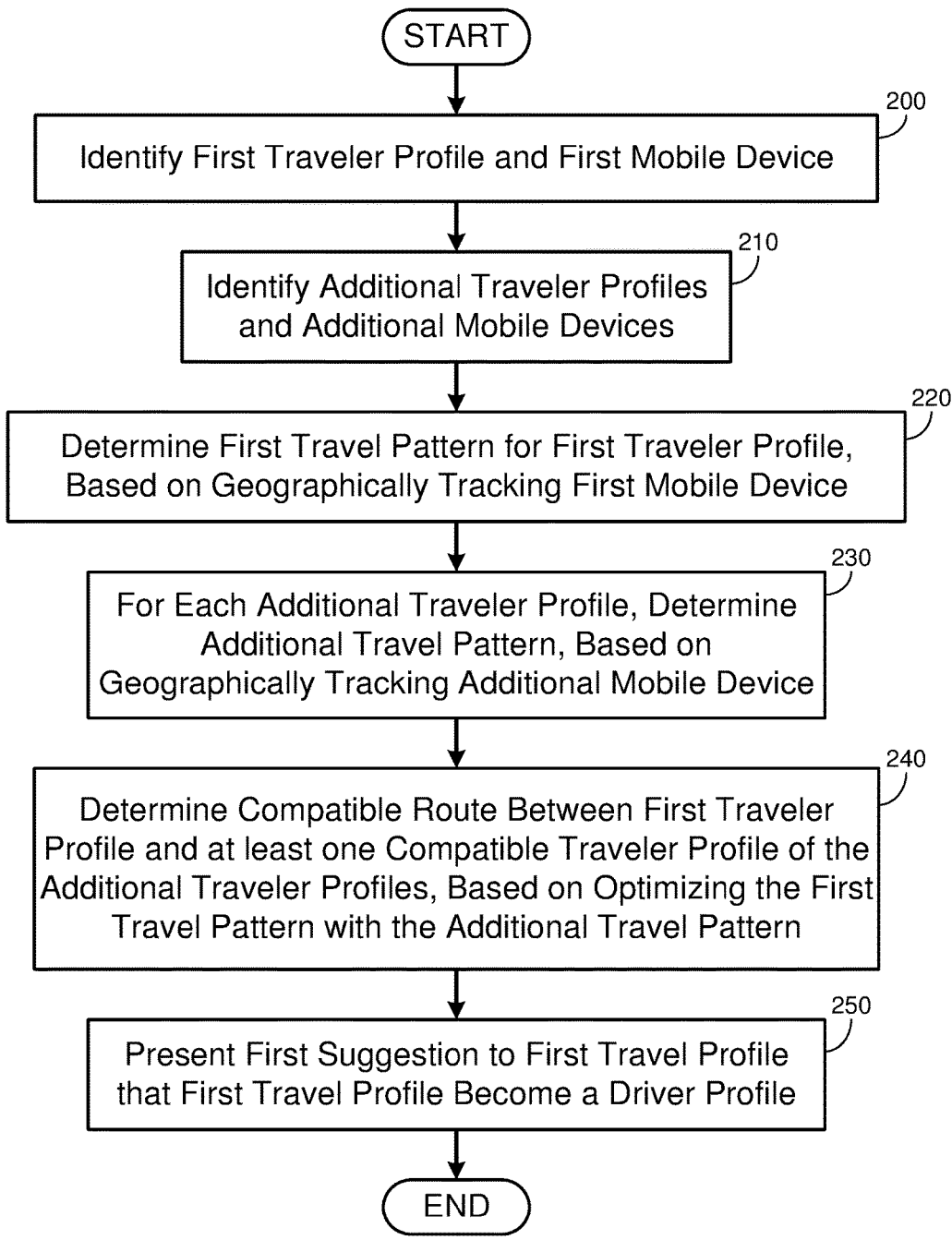
FIG. 2 is a flowchart diagram depicting operational steps for a driver suggestion program, in accordance with at least one embodiment of the present invention.

Referring now to FIG. 2, FIG. 2 is flowchart diagram displaying various operational steps for the driver suggestion program 101, in accordance with at least one embodiment of the invention. At step 200, the driver suggestion program 101 may identify a first traveler profile. The first traveler profile is associated with a first mobile device. In the context of the driver suggestion program 101, the first traveler profile may be understood as the traveler profile to which the driver suggestion program 101 suggests becoming a driver. The first mobile device is a mobile device belonging to and/or used by the first traveler profile, for example the traveler 110 may own his/her mobile device 112. At step 210, the driver suggestion program 101 may identify one or more additional traveler profiles. Each of the one or more additional traveler profiles is associated with an additional mobile device. The additional traveler profiles may be understood to represent other users of the system, each with his or her own associated mobile device, to which the driver suggestion program 101 may suggest becoming passengers to the first user as driver.

At step 220, the driver suggestion program 101 determines, for the first traveler profile, a first travel pattern, based on geographically tracking the first mobile device. The first travel pattern may be a regular route traveled by the first user. For example, the traveler profile 102 as first user may regularly drive between home and work using the car 114; such a trip may be treated as the first travel pattern. Alternatively, the first travel pattern need not be driven by the first user; rather, the driver suggestion program 101 may include cases where the first user travels the first travel pattern by public transport, ride hire service, or other means, but where the first user has a car available and could drive the first travel pattern.

At step 230, for each of the one or more additional traveler profiles, the driver suggestion program 101 determines an additional travel pattern, based on geographically tracking the additional mobile device. The additional travel pattern may be understood as a route regularly traveled by a user to whom the driver suggestion program 101 may suggest becoming a passenger to the first traveler. The additional travel pattern may generally include routes by any mode, including the additional traveler driving himself or herself, using a ride hire application, or using public transport.

At step 240, the driver suggestion program 101 determines at least one compatible route between the first travel profile and at least one compatible travel profile of the one or more additional travel profiles, based on optimizing the first travel pattern with the additional travel pattern, for each additional travel profile considered. The first travel profile may comprise an optimal driver for the at least one compatible route. Determining the compatible route may be achieved by pattern extraction and optimization on the extracted patterns via an analytics engine, such as IBM® Watson®.

Examples of patterns that the driver suggestion program 101 may extract from the first travel pattern and additional patterns include analyzing waypoints. Optimizing the first travel pattern with the additional travel patterns may include matching at least one of an origin and destination for the additional travel pattern to a waypoint for the first travel pattern. As an example, A, the first traveler, travels 30 miles to work along an expressway from exit 45 to exit 15, and back again. B, an additional traveler, travels 8 miles to work along the same expressway from exit 25 to exit 17. In this scenario, the driver suggestion program 101 may identify B's origin and destination as waypoints along A's route, and thus A's route may be identified as a compatible route. In a similar scenario, C travels 22 miles to work on the same expressway from exit 28 to exit 6. C's origin is a waypoint for A, but C's destination is not. The driver suggestion program 101 may evaluate whether the added distance for A to drive C is outweighed by the possible benefits to A and C of C hiring A using a car hire service, and may suggest the route as compatible, or not.

At step 250, the driver suggestion program 101 presents to the first traveler profile, via the first mobile device, a first suggestion that the first traveler profile become a driver profile for at least one travel application. The travel application may be a car hire application such as Uber® or Lyft®, or may function differently. In alternative embodiments, the travel application may include non-commercial ride sharing systems, routing and reporting systems such as Waze®, and professional driver hiring systems such as apps that arrange taxi and limousine service.

In some embodiments, the driver suggestion program 101 may present to each compatible traveler profile (i.e., those of the additional traveler profiles whose routes were compatible with the first profile's route), via the additional mobile device, an additional suggestion that the compatible traveler profile become a passenger for the driver profile (that is, the first profile in its role as driver) in the at least one travel application. More specifically, the driver suggestion program 101 may recommend to the traveler 110 to start using the car hire application instead of other modes of transport (e.g., bus, train) or other ways of driving (driving themself).

In some embodiments, the first travel pattern may be based on usage of a car hire application on the first mobile device, and/or the additional travel patterns may be based on usage of car hire applications on the additional mobile devices. More specifically, the traveler 110 may take account of whether users habitually commute using a car hire service, or not. In other embodiments, the driver suggestion program 101 may, when determining the first travel pattern, exclude one or more trips from consideration, based on the one or more trips being ordered via a car hire application. That is, if a user is already riding a route via car hire application, there may not be an efficiency to be gained or matching to be made by suggesting that the user drive instead.

It should be noted that the driver suggestion program 101 may be applied to different classes of users of mobile devices. In some embodiments, travel profiles may be collected for all users of a mobile phone operating system that supports software embodying the invention, regardless of whether users have installed, have joined, or regularly use a car hire application. Suggestions may also be restricted to users who opt-in, but also regardless of the users' use of car hire applications. Accordingly, the driver suggestion program 101 may present a second suggestion to install at least one car hire application. Alternatively, suggestions may be limited to users of a particular car hire application, based on the assumption that such users are used to the idea of car hire applications and may be willing to become drivers or change their daily commute to the car hire application.

Figure 3:
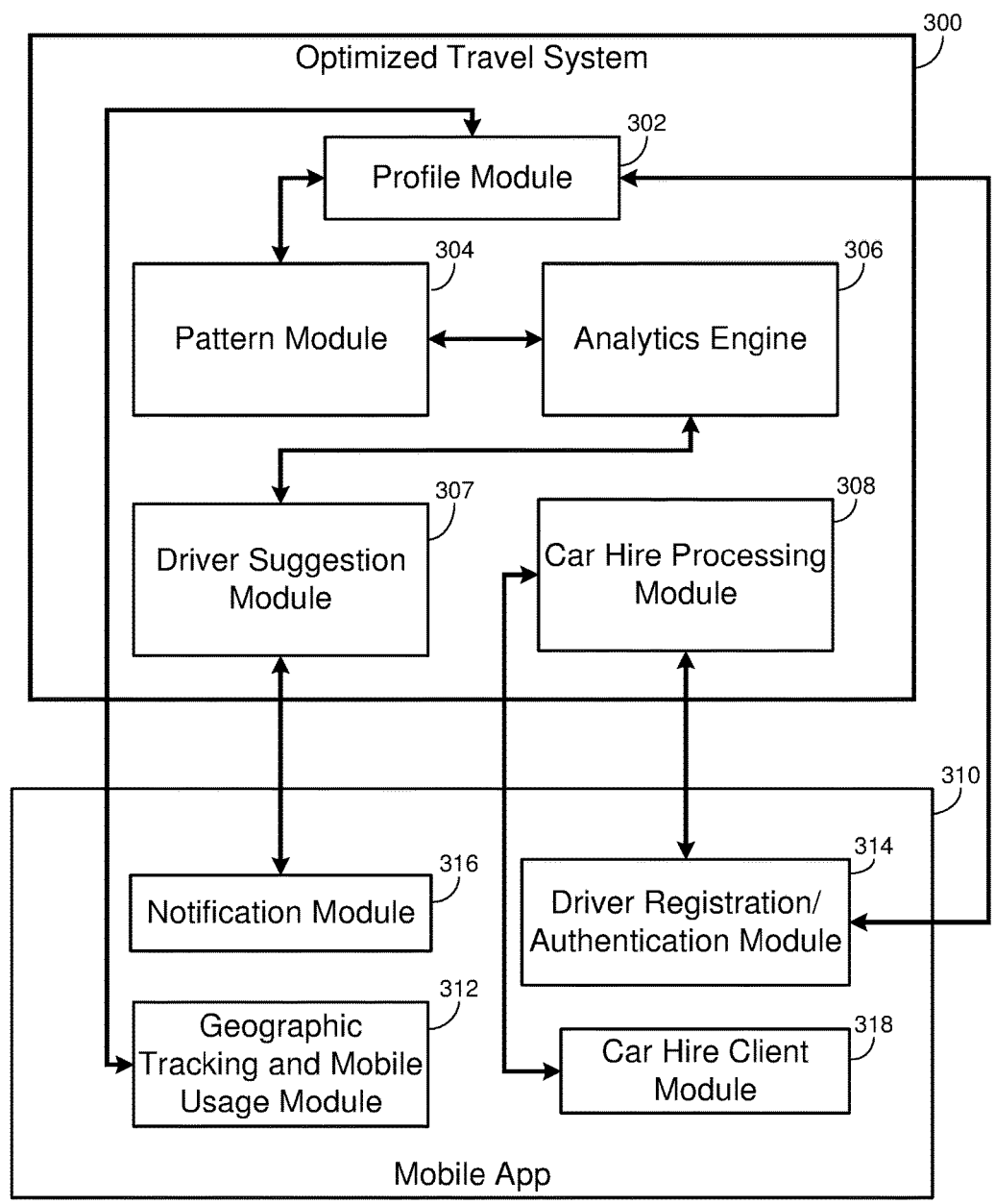
FIG. 3 is a block diagram depicting various logical modules for a driver suggestion program, in accordance with at least one embodiment of the present invention.

Referring now to FIG. 3, FIG. 3 is a block diagram depicting various logical modules for a driver suggestion program, in accordance with at least one embodiment of the present invention. The depicted embodiment may be organized along a client-server model with the optimized travel system 300 operating on a physical, logical, or virtual server environment along the lines of the computing environment of FIG. 4. Both the client and server environments are described in terms of software modules serving various functions. The client may be a mobile app 310 operating on a mobile device along the lines of the computing environment depicted in FIG. 4.

A profile module 302 may perform the function of a database server storing data on the traveler 110 and his or her travel patterns, mobile app usage, etc. Such data may be collected and reported to the profile module 302 by a geographic tracking and mobile usage module 312, which may be understood as a software package that monitors geographic position, app usage, and other activity on the mobile device 112. The profile module 302 may also collect data from a driver registration/authentication module 314, which may be a software package that confirms user identity for purposes of transacting with the car hire service or other travel application.

Patterns may be extracted from the data stored by the profile module 302 by a pattern module 304. The pattern module 304 may be a software library or engine that extracts patterns, trends, modes, etc. using automated statistical and/or analytical techniques. The extracted patterns may be processed in an analytics engine 306. The analytics engine 306 may be a software library and/or engine that performs optimized matching on input patterns. The analytics engine 306 may include various components of IBM® Watson®. The analytics engine 306 may output to a driver suggestion module 307, which may present driver and/or passenger suggestions via a notification module 316 on the mobile app 310. The notification module 316 may be a user interface program that may present notifications via push-up notice, sound playback, video playback, image display, email notification, text message notification, etc.

In addition, the driver registration/authentication module 314 may communicate directly with a car hire processing module 308, which arranges actual rides, charges passengers, pays drivers, etc., as is done in services such as Uber® and Lyft®. The car hire processing module 308 may communicate with a car hire client module 318, which is a user interface software program that allows users to interact with the car hire service, as is done in client apps with services such as Uber® and Lyft®.

Figure 4:
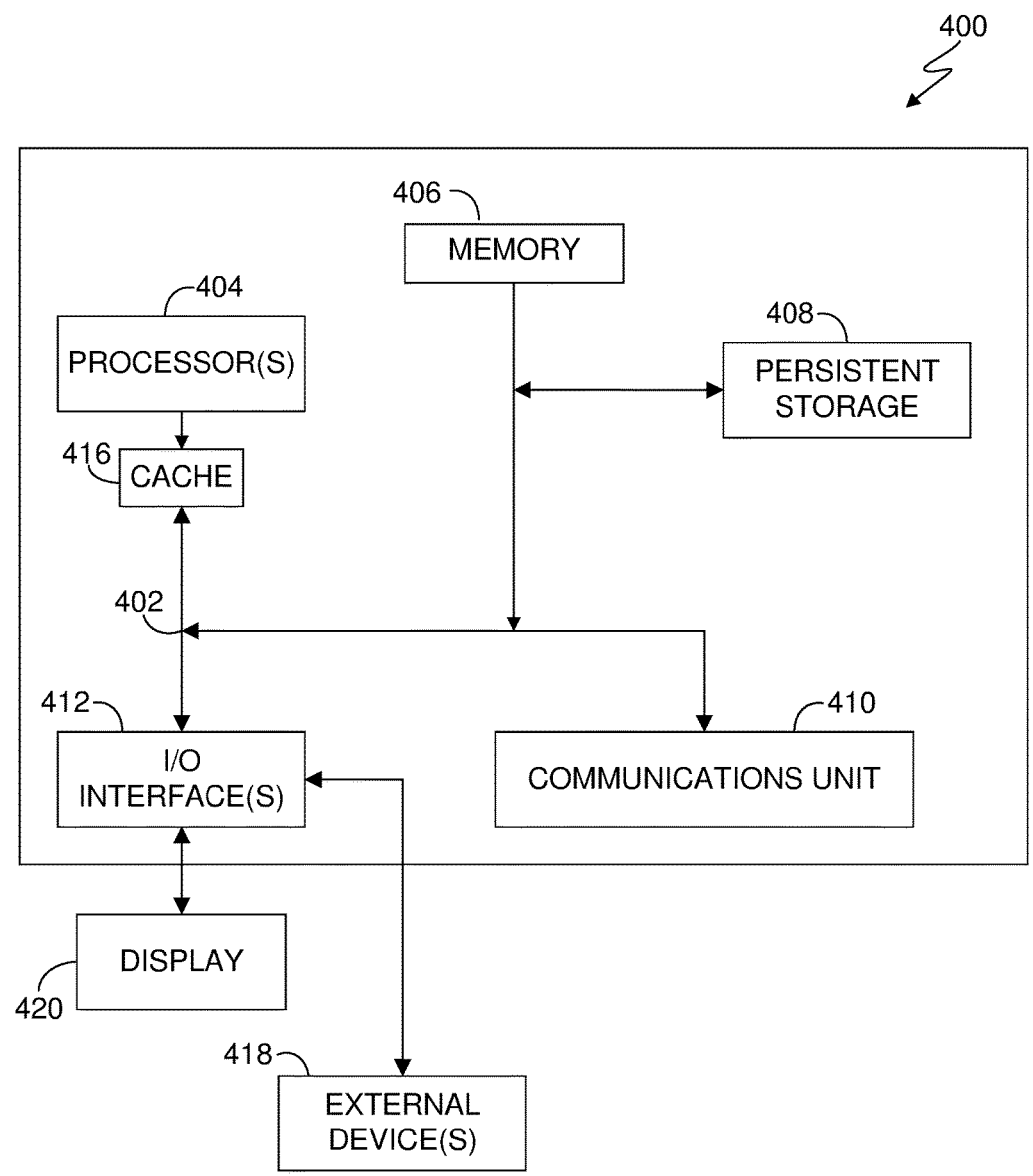
FIG. 4 is a block diagram depicting various logical elements for a computer system capable of executing program instructions, in accordance with at least one embodiment of the present invention.

FIG. 4 is a block diagram depicting components of a computer 400 suitable for executing the driver suggestion program 101. FIG. 4 displays the computer 400, the one or more processor(s) 404 (including one or more computer processors), the communications fabric 402, the memory 406, the RAM, the cache 416, the persistent storage 408, the communications unit 410, the I/O interfaces 412, the display 420, and the external devices 418. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the cache 416, the computer processor(s) 404, the memory 406, the persistent storage 408, the communications unit 410, and the input/output (I/O) interface(s) 412. The communications fabric 402 may be implemented with any architecture suitable for passing data and/or control information between the processors 404 (e.g., microprocessors, communications processors, and network processors, etc.), the memory 406, the external devices 418, and any other hardware components within a system. For example, the communications fabric 402 may be implemented with one or more buses or a crossbar switch.

The memory 406 and persistent storage 408 are computer readable storage media. In the depicted embodiment, the memory 406 includes a random access memory (RAM). In general, the memory 406 may include any suitable volatile or non-volatile implementations of one or more computer readable storage media. The cache 416 is a fast memory that enhances the performance of computer processor(s) 404 by holding recently accessed data, and data near accessed data, from memory 406.

Program instructions for the driver suggestion program 101 may be stored in the persistent storage 408 or in memory 406, or more generally, any computer readable storage media, for execution by one or more of the respective computer processors 404 via the cache 416. The persistent storage 408 may include a magnetic hard disk drive. Alternatively, or in addition to a magnetic hard disk drive, the persistent storage 408 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 may include one or more network interface cards. The communications unit 410 may provide communications through the use of either or both physical and wireless communications links. The driver suggestion program 101 may be downloaded to the persistent storage 408 through the communications unit 410. In the context of some embodiments of the present invention, the source of the various input data may be physically remote to the computer 400 such that the input data may be received and the output similarly transmitted via the communications unit 410.

The I/O interface(s) 412 allows for input and output of data with other devices that may operate in conjunction with the computer 400. For example, the I/O interface 412 may provide a connection to the external devices 418, which may include a keyboard, keypad, a touch screen, and/or some other suitable input devices. External devices 418 may also include portable computer readable storage media, for example, thumb drives, portable optical or magnetic disks, and memory cards. Software and data used to practice embodiments of the present invention may be stored on such portable computer readable storage media and may be loaded onto the persistent storage 408 via the I/O interface(s) 412. The I/O interface(s) 412 may similarly connect to a display 420. The display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
    identifying a first traveler profile, said first traveler profile being associated with a first mobile device and a first traveler;
    identifying one or more second traveler profiles, each of said one or more second traveler profiles being associated with a second mobile device and a second traveler;
    for said first traveler profile, determining a first historical travel pattern, by geographically tracking said first mobile device based at least on Global Positional System (GPS) data received by the first mobile device, wherein said first historical travel pattern comprises one or more trips where said first traveler traveled as a passenger, excluding trips where said first traveler traveled as a passenger but that were ordered by said first traveler using a car hire application;

for each of said one or more second traveler profiles, determining a second historical travel pattern, by geographically tracking said second mobile device based at least on GPS data received by the second mobile device;

determining at least one compatible route between said first traveler profile and at least one compatible second traveler profile of said one or more second traveler profiles, based on optimizing said first historical travel pattern with said second historical travel pattern, wherein said first traveler comprises an optimal driver for said at least one compatible route; and presenting to said first traveler, via said first mobile device, a first suggestion that said first traveler profile become a driver profile for said car hire application.

2. The computer-implemented method of claim 1, wherein optimizing said first historical travel pattern with said second historical travel pattern comprises matching at least one of an origin and a destination for said second historical travel pattern to a waypoint for said first historical travel pattern.

3. The computer-implemented method of claim 1, further comprising:
presenting to each second traveler associated with each compatible second traveler profile, via said second mobile device, an additional suggestion that said compatible second traveler profile become a passenger profile for said driver profile in said car hire application.

4. The computer-implemented method of claim 1, wherein
determining said second historical travel pattern is further based on usage of said car hire application on said second mobile device.

5. The computer-implemented method of claim 1, wherein:
at least one of:
geographically tracking said first mobile device; or
geographically tracking said second mobile device is performed as a function of a mobile device operating system.

6. The computer-implemented method of claim 1, further comprising presenting, via at least one of said first mobile device and said second mobile device, a second suggestion to install said car hire application.

7. A computer program product comprising one or more computer readable storage media and program instructions stored on said one or more computer readable storage media, said computer readable storage media not being transitory signals per se, said program instructions comprising instructions to:
identify a first traveler profile, said first traveler profile being associated with a first mobile device and a first traveler;
identify one or more second traveler profiles, each of said one or more second traveler profiles being associated with a second mobile device and a second traveler;
for said first traveler profile, determine a first historical travel pattern, by geographically tracking said first mobile device based at least on Global Positional System (GPS) data received by the first mobile device, wherein said first historical travel pattern comprises one or more trips where said first traveler traveled as a passenger, excluding trips where said first traveler traveled as a passenger but that were ordered by said first traveler using a car hire application;

for each of said one or more second traveler profiles, determine a second historical travel pattern, by geographically tracking said second mobile device based at least on GPS data received by the second mobile device;

determine at least one compatible route between said first traveler profile and at least one compatible second traveler profile of said one or more second traveler profiles, based on optimizing said first historical travel pattern with said second historical travel pattern, wherein said first traveler comprises an optimal driver for said at least one compatible route; and present to said first traveler, via said first mobile device, a first suggestion that said first traveler profile become a driver profile for said car hire application.

8. The computer program product of claim 7, wherein optimizing said first historical travel pattern with said second historical travel pattern comprises matching at least one of an origin and a destination for said second historical travel pattern to a waypoint for said first historical travel pattern.

9. The computer program product of claim 7, wherein said program instructions further comprise instructions to:
present to each second traveler associated with each compatible second traveler profile, via said second mobile device, an additional suggestion that said compatible second traveler profile become a passenger profile for said driver profile in said car hire application.

10. The computer program product of claim 7, wherein said instructions to determine said second historical travel pattern are further based on usage of said car hire application on said second mobile device.

11. The computer program product of claim 7, wherein at least one of:
geographically tracking said first mobile device; or
geographically tracking said second mobile device is performed as a function of a mobile device operating system.

12. The computer program product of claim 7, wherein said program instructions further comprise instructions to present, via at least one of said first mobile device and said second mobile device, a second suggestion to install said car hire application.

13. A computer system comprising:
one or more processors;
one or more computer readable storage media, said computer readable storage media not being transitory signals per se;
computer program instructions;
said computer program instructions being stored on said one or more computer readable storage media;
said computer program instructions comprising instructions to:
identify a first traveler profile, said first traveler profile being associated with a first mobile device and a first traveler;
identify one or more second traveler profiles, each of said one or more second traveler profiles being associated with a second mobile device and a second traveler;
for said first traveler profile, determine a first historical travel pattern, by geographically tracking said first mobile device based at least on Global Positional System (GPS) data received by the first mobile device, wherein said first historical travel pattern comprises one or more trips where said first traveler traveled as a passenger, excluding trips where said first traveler traveled as a passenger but that were ordered by said first traveler using a car hire application;

for each of said one or more second traveler profiles, determine a second historical travel pattern, by geographically tracking said second mobile device based at least on GPS data received by the second mobile device;

determine at least one compatible route between said first traveler profile and at least one compatible second traveler profile of said one or more second traveler profiles, based on optimizing said first historical travel pattern with said second historical travel pattern, wherein said first traveler comprises an optimal driver for said at least one compatible route; and present to said first traveler, via said first mobile device, a first suggestion that said first traveler profile become a driver profile for said car hire application.

14. The computer system of claim 13, wherein optimizing said first historical travel pattern with said second historical travel pattern comprises matching at least one of an origin and a destination for said second historical travel pattern to a waypoint for said first historical travel pattern.

15. The computer system of claim 13, wherein:
said computer program instructions further comprise instructions to present to each second traveler associated with each compatible second traveler profile, via said second mobile device, an additional suggestion that said compatible second traveler profile become a passenger profile for said driver profile in said car hire application.

* * * * *